(12) United States Patent
Lee

(10) Patent No.: US 11,453,454 B2
(45) Date of Patent: Sep. 27, 2022

(54) BICYCLE REARVIEW MIRROR

(71) Applicant: Dong-Lie Lee, Taichung (TW)

(72) Inventor: Dong-Lie Lee, Taichung (TW)

(*) Notice: Subject to any disclaimer, the term of this patent is extended or adjusted under 35 U.S.C. 154(b) by 72 days.

(21) Appl. No.: 17/124,459

(22) Filed: Dec. 16, 2020

(65) Prior Publication Data
US 2021/0101657 A1    Apr. 8, 2021

Related U.S. Application Data

(63) Continuation-in-part of application No. 16/553,049, filed on Aug. 27, 2019, now abandoned.

(51) Int. Cl.
*B62J 29/00* (2006.01)
*G02B 7/182* (2021.01)

(52) U.S. Cl.
CPC .............. *B62J 29/00* (2013.01); *G02B 7/182* (2013.01)

(58) Field of Classification Search
CPC ... B62J 29/00; G02B 5/08; G02B 7/18; G02B 7/182; G02B 7/1824; G02B 7/1825
USPC .............................................. 248/475.1–488
See application file for complete search history.

(56) References Cited

U.S. PATENT DOCUMENTS

| | | | | |
|---|---|---|---|---|
| 3,392,950 A * | 7/1968 | Pierce | ...................... | A47G 1/24 359/872 |
| 3,428,286 A * | 2/1969 | Del Pesco | .............. | F16M 13/02 248/278.1 |
| 3,955,884 A * | 5/1976 | Del Pesco, Sr. | ...... | G02B 25/005 359/817 |
| 4,603,944 A * | 8/1986 | Greenlaw | ............ | G02B 7/1824 359/818 |
| 5,076,701 A * | 12/1991 | Greenlaw | ............ | G02B 7/1824 359/879 |
| 5,106,177 A * | 4/1992 | Dolasia | ..................... | B60R 1/04 248/478 |
| 6,062,697 A * | 5/2000 | Bryant | .................... | B60R 1/003 359/872 |
| 7,591,446 B2 * | 9/2009 | Istas | ........................ | F16M 11/14 403/77 |
| 8,038,332 B2 * | 10/2011 | Lin | .......................... | B62J 6/165 362/494 |
| 8,695,253 B2 * | 4/2014 | Bednarksi | ................. | G09F 7/20 40/607.13 |
| D707,740 S * | 6/2014 | Kawai | .................. | G02B 27/028 D16/135 |
| 2010/0277821 A1 * | 11/2010 | Roth | ......................... | B60R 1/04 359/872 |
| 2020/0247497 A1 * | 8/2020 | Driant | ...................... | B62J 29/00 |

* cited by examiner

*Primary Examiner* — William V Gilbert

(57) ABSTRACT

A rearview mirror includes a mirror frame and a mirror mount. The end of the mirror frame, which is connected to the mirror mount, is formed with a through hole. The mirror mount has an upper mount, a clamp and a lower mount. The upper mount is pivotedly connected to the mirror frame and has a ball joint. The ball joint is received in the clamp. The lower mount has a receiving hole for being inserted by the clamp.

4 Claims, 4 Drawing Sheets

BICYCLE REARVIEW MIRROR

CROSS-REFERENCE TO RELATED APPLICATIONS

This application is a continuation-in-part of U.S. patent application Ser. No. 16/553,049 filed Aug. 27, 2019.

TECHNICAL FIELD

The invention relates to bicycles, particularly to rearview mirrors for bicycles.

RELATED ART

A driver or rider of a vehicle such as a car, a motorcycle or a bicycle must pay attention to rear traffic by rearview mirrors. Rearview mirrors are very important for bicycle riders, especially in urban commuting. Conventional rearview mirrors for bicycles have various drawbacks such as high wind resistance, heavy weight and limited adjustment range. Thus they are inconvenient for riders.

SUMMARY OF THE INVENTION

An object of the invention is to provide a bicycle rearview mirror, which has low wind resistance, light weight and wide adjustment range.

To accomplish the above object, the bicycle rearview mirror of the invention includes a mirror frame and a mirror mount. The end of the mirror frame, which is connected to the mirror mount, is formed with a through hole. The mirror mount has an upper mount, a clamp and a lower mount. The upper mount is pivotedly connected to the mirror frame and has a ball joint. The ball joint is received in the clamp. The lower mount has a receiving hole for being inserted by the clamp.

DETAILED DESCRIPTION OF THE INVENTION

Figure 1:
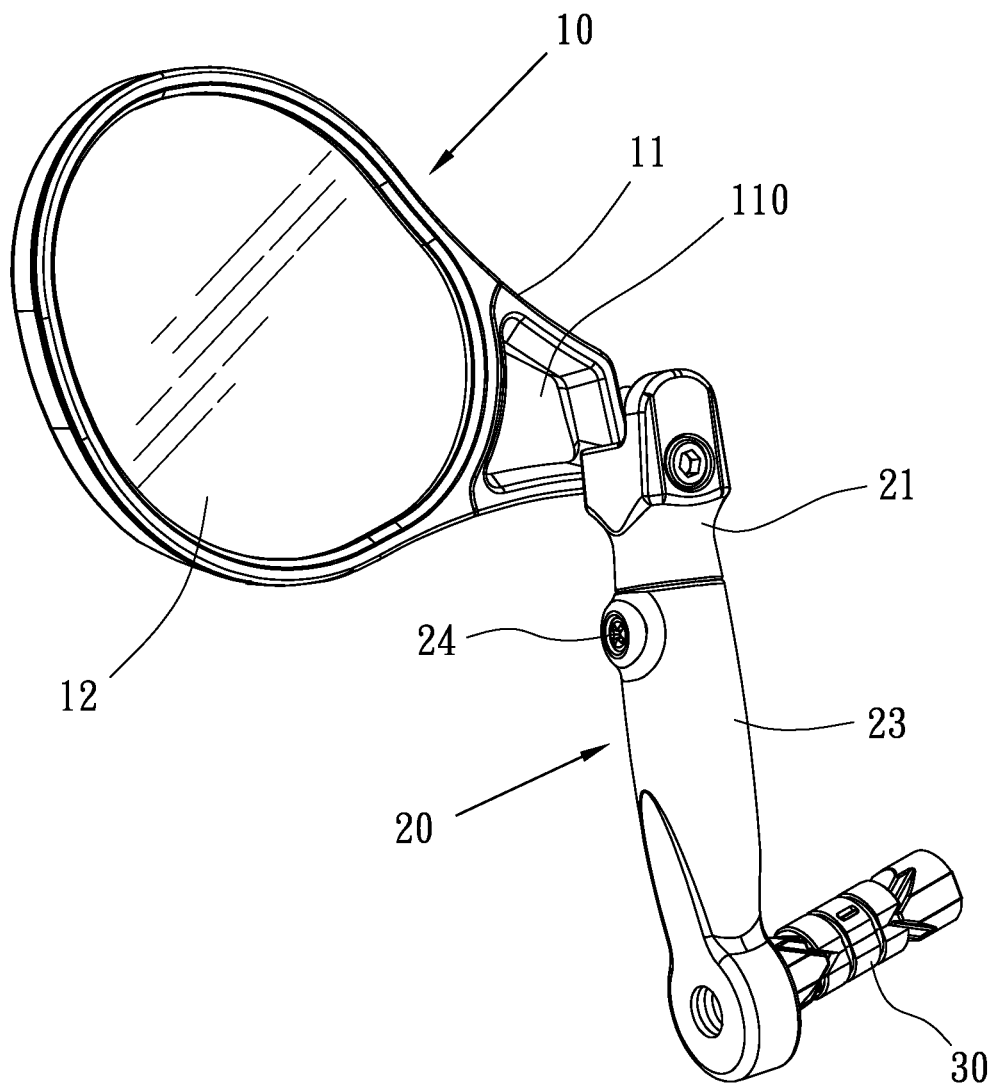
FIG. 1 is a perspective view of the invention.
Figure 2:
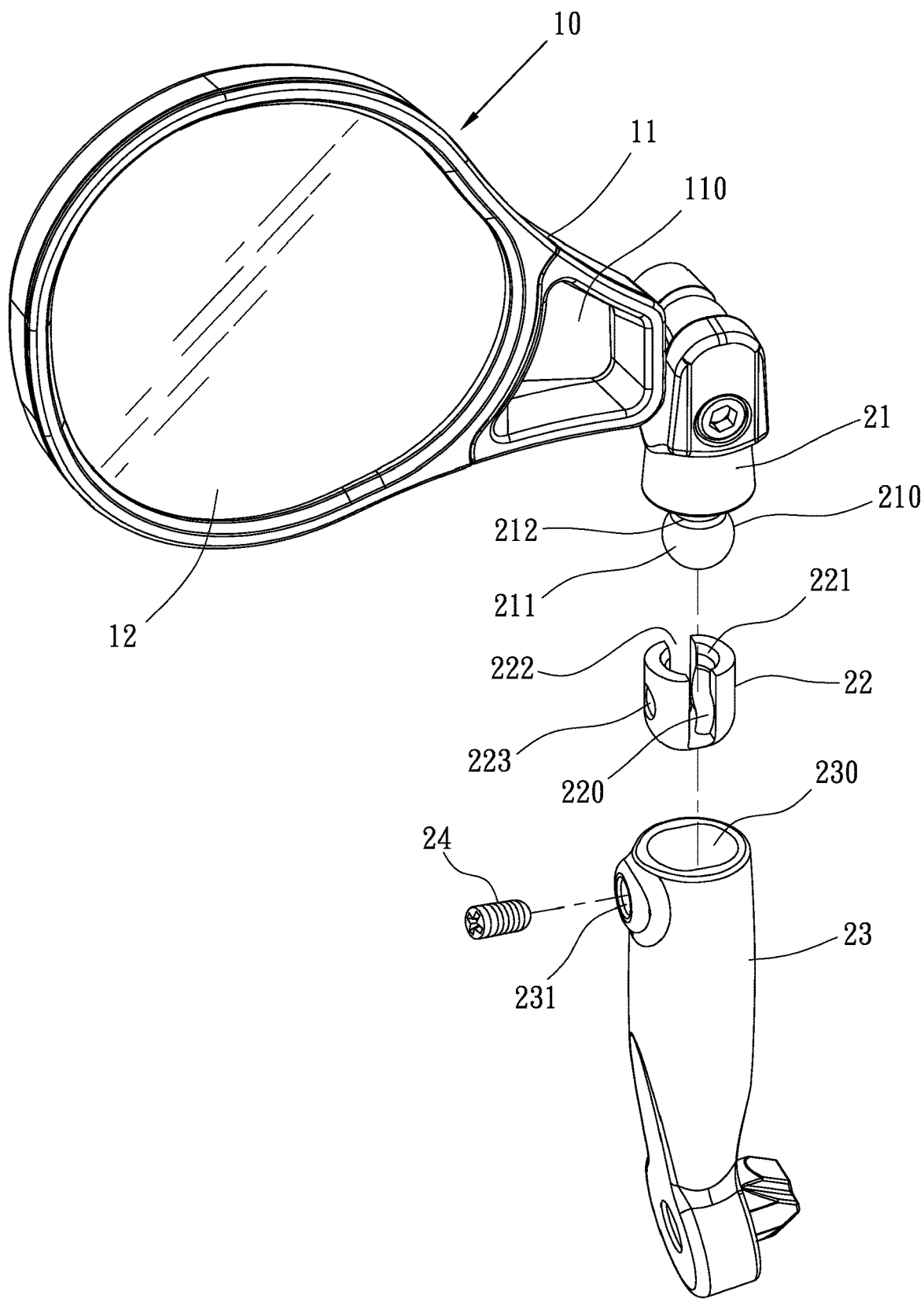
FIG. 2 is an exploded view of the invention.
Figure 3:
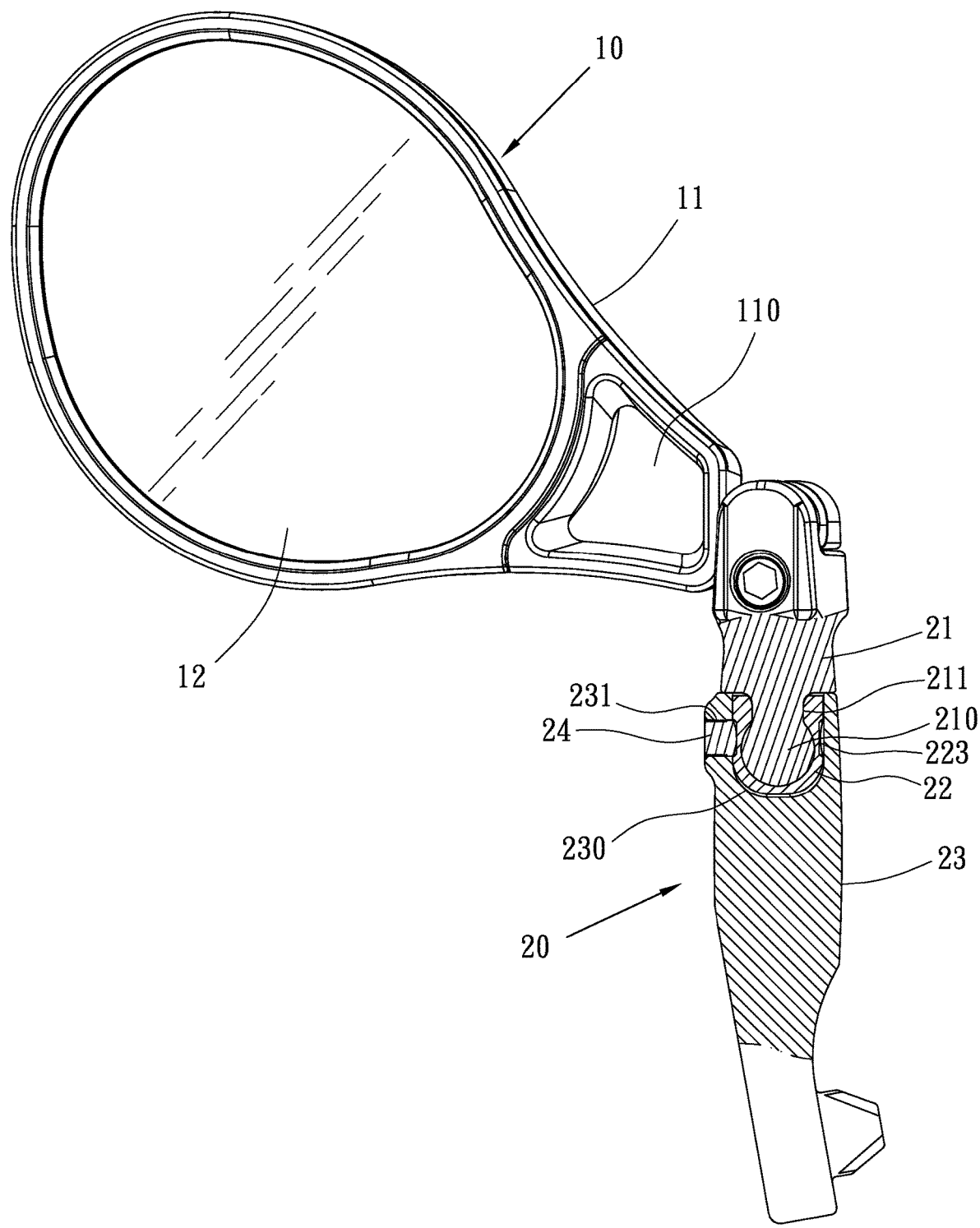
FIG. 3 is a partial cross-section view.
Figure 4:
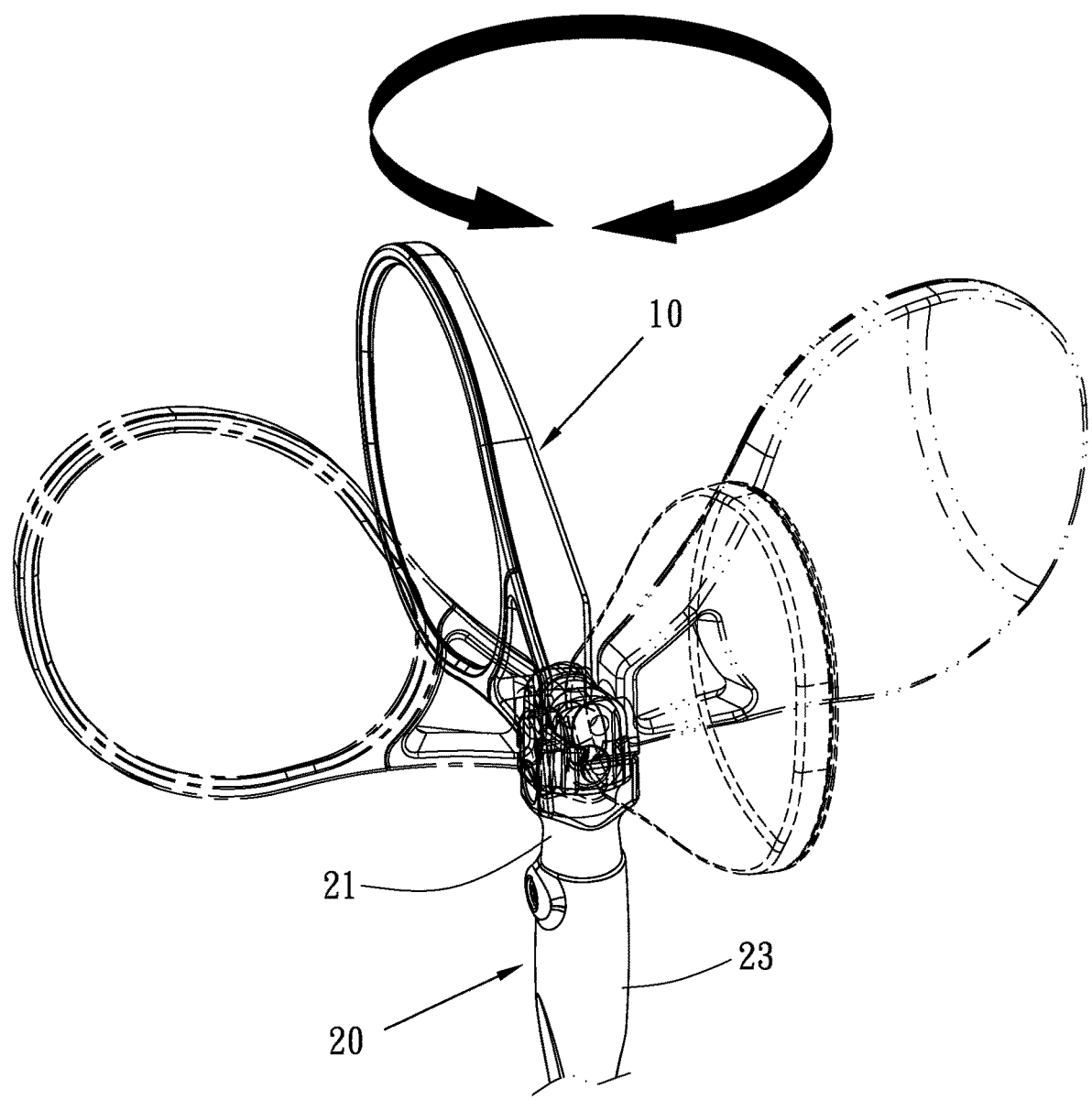
FIG. 4 is a schematic view of the invention in a rotational status.

Please refer to FIGS. 1-4. The invention provides a bicycle rearview mirror 10 including a mirror frame 11 and a mirror mount 20. The mirror frame 11 is provided with a mirror 12. The end of the mirror frame 11, which is connected to the mirror mount 20, is formed with a through hole 110. The through hole 110 is helpful to lightweight.

The mirror mount 20 has an upper mount 21, a clamp 22 and a lower mount 23. The upper mount 21 is pivotedly connected to an end of the mirror frame 11. The lower mount 23 is used for being fastened onto a handlebar of a bicycle. A ball joint 210 is formed at an outer end of the upper mount 21. The ball joint 210 includes a ball 211 and a neck 212 between the ball 211 and the upper mount 21. The ball joint 210 is received in the clamp 22 with a spherical cavity 220 and an opened trough 221. The clamp 22 is of a non-circular shape. A cross slot 222 passes from the opened trough 221 to the bottom of the clamp 22 through the spherical cavity 220 to split the clamp 22 into two halves. The two halves are connected by the bottom of the clamp 22 to make the clamp 22 be able to flexibly hold the ball 211. At least one of the two halves is formed with a recess 223. The lower mount 23 has a receiving hole 230. The receiving hole 230 is of a non-circular shape corresponding to the clamp 22 for being nonrotatably inserted by the clamp 22. The lower mount 23 is formed with a locking hole 231 corresponding to the recess 223. A fastener 24 passes through the locking hole 231 to be embedded into the recess 223 to position the clamp 22. The upper mount 21 and the lower mount 23 can be firmly connected by the clamp 22. The upper mount 21 can be axially rotated when the fastener 24 is loosened.

A bottom end of the lower mount 23 is provided with a fixing base 30 for connecting to a handlebar of a bicycle as shown in FIG. 1.

What is claimed is:

1. A rearview mirror for a bicycle, comprising:
   a mirror frame; and
   a mirror mount, having an upper mount and a lower mount, the upper mount being pivotedly connected to the mirror frame and having a ball joint, the ball joint comprising a ball and a neck connected between the ball and the upper mount, the ball joint being received in a clamp with a spherical cavity and an opened trough, a cross slot passing from the opened trough to a bottom of the clamp through the spherical cavity to split the clamp into two halves, the two halves being connected by the bottom of the clamp to make the clamp flexibly hold the ball, one of the two halves being formed with a recess, and the lower mount having a receiving hole, the receiving hole being of a shape corresponding to the clamp, the clamp being nonrotatably inserted into the receiving hole, the lower mount being formed with a locking hole corresponding to the recess, and a fastener passing through the locking hole to be embedded into the recess to position the clamp.

2. The rearview mirror of claim 1, wherein an end of the mirror frame, which is connected to the mirror mount, is formed with a through hole.

3. The rearview mirror of claim 1, wherein a bottom end of the lower mount is provided with a fixing base for connecting to a handlebar.

4. The rearview mirror of claim 1, wherein the locking hole is a threaded hole and the fastener is a screw.

* * * * *